Oct. 25, 1938.    J. C. BUCHANAN    2,134,101
REFRIGERATING APPARATUS
Filed May 8, 1935
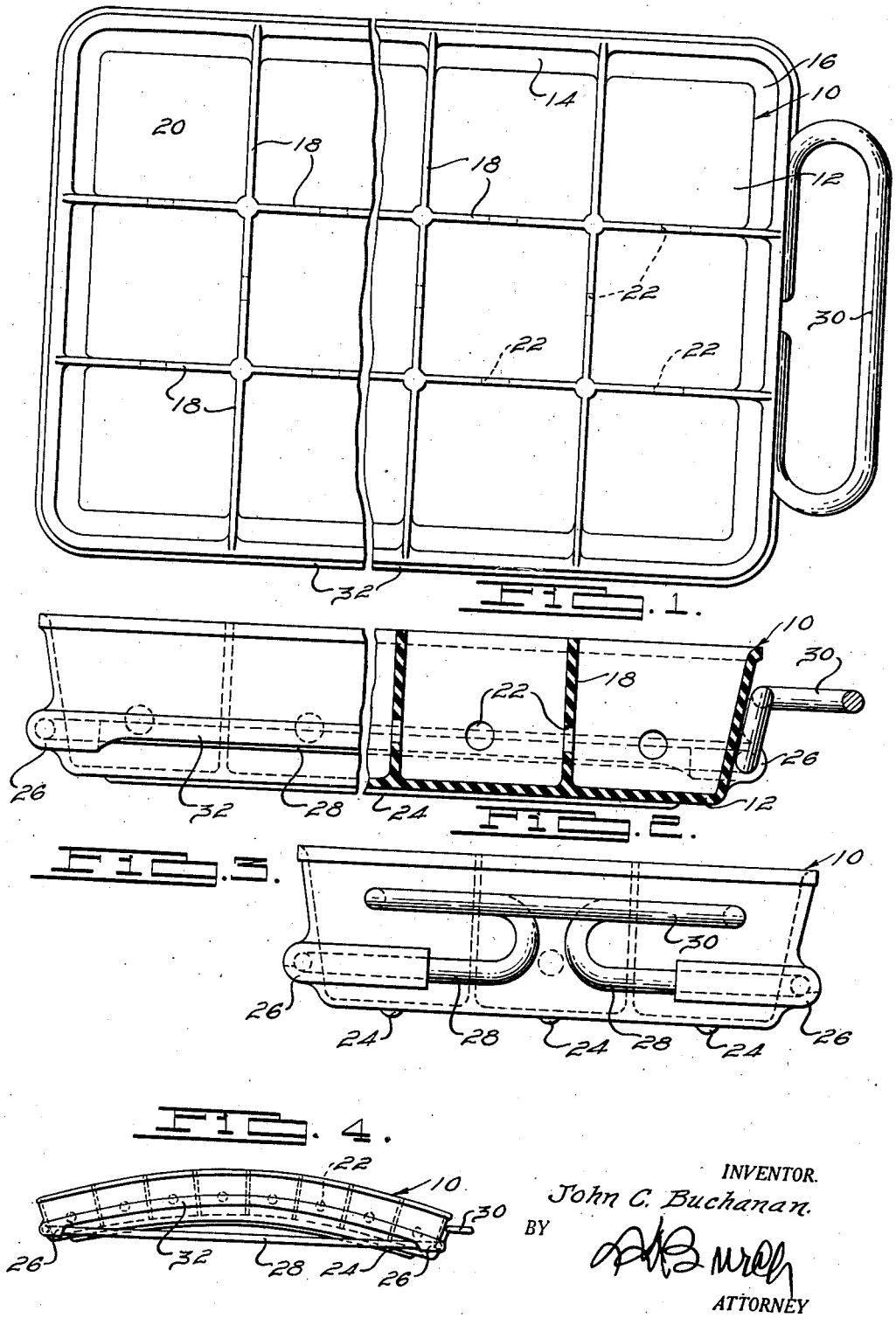
INVENTOR.
John C. Buchanan.
BY
ATTORNEY Patented Oct. 25, 1938

2,134,101

UNITED STATES PATENT OFFICE 2,134,101

REFRIGERATING APPARATUS

John C. Buchanan, Detroit, Mich., assignor to Borg-Warner Corporation, a corporation of Illinois Application May 8, 1935, Serial No. 20,428

7 Claims. (Cl. 62—108.5)

This invention relates to refrigerating apparatus and particularly to ice tray construction therefor.

In domestic refrigerators it is the practice to provide in connection with the evaporator disposed in the food storage compartment a tray or pan in which water is adapted to be placed for the purpose of freezing the same to provide a plurality of ice cubes. Considerable difficulty has heretofore been experienced in connection with the removal of ice cubes from such pans or trays on account of the fact that the water in freezing will freeze to the body of the pan and also expand so as to make it quite difficult to remove such ice trays without considerable effort and without wasting an appreciable amount of the ice in thawing the same loose from the pan.

This invention contemplates the provision of a pan or tray constructed of a resilient material to which the ice will not stick and which pan or tray is adapted to be distorted readily so as to permit the easy removal of the ice cubes therefrom. In the embodiment of the invention selected for purposes of illustration, there is provided a molded rubber pan, provided with a plurality of partitions to form a series of pockets within the pan, and a wire frame is provided for the pan to hold the same in a more or less rigid position to hold water. The framework is so connected to the pan as to permit the distortion of the pan without distorting the frame so that the walls of the pan may be moved apart to permit the ready removal of the ice cubes therefrom.

For a better understanding of the invention and the advantages thereof, reference may be had to the following specification taken in conjunction with the accompanying drawing of which there is one sheet and in which:

Fig. 1 is a plan view of an ice tray embodying the invention, a portion of the center thereof having been omitted;

Fig. 2 is a side elevation partly in section of the tray illustrated in Fig. 1;

Fig. 3 is an end elevation of the ice tray showing the handle therefor; and

Fig. 4 is a view showing the manner in which the tray is adapted to be operated for releasing the ice cubes therefrom.

A rectangularly shaped pan 10 having a bottom wall 12, side walls 14 and end walls 16 is formed of a resilient material such as rubber as by molding and is provided with a plurality of integral partitions 18 which form a plurality of pockets or compartments 20 in which water or other liquids are adapted to be placed for the purpose of freezing them in cube form.

The compartments 20 are interconnected by means of a number of openings 22 provided in the walls 18 so that the liquid in the pan 10 may seek its own level.

The bottom of the pan 10 on the under side thereof is provided with a plurality of longitudinally extending ridges 24 which are adapted to support the bottom wall 12 of the pan out of contact with the wall or shelf of the evaporator upon which it is adapted to rest, so that air may circulate beneath the pan to expedite the freezing of the liquid within the bottom of the compartment 20. The side and end walls 14 and 16 of the pan 10, it will be observed, flare outwardly to expedite the removal of the frozen cubes from the compartment 20.

On the outside of the pan 10 adjacent each of the corners thereof there are provided integral projections 26 through which a passageway is provided for receiving a wire frame 28, which is bent to form a portion corresponding in shape with the outside of the pan 10, and a handle portion 30. The frame 28 is adapted to be inserted through the passageways in the projections 26 after the pan has been molded or otherwise formed. Along the sides 14 externally thereof, it may be observed that there are provided shoulders 32 extending between the projections 26 and which shoulders 32 are adapted to overlie the side members of the frame 28 for the purpose of supporting the pan intermediate the ends thereof.

It will be observed that the frame 28 encircles the pan adjacent the bottom thereof. This relative location of the frame members to the pan 10 facilitates the removal of the ice cubes from the pockets 20 of the pan 10. When the pan 10 is distorted such as illustrated in Fig. 4, the body of the pan 10 may be stretched so as to move apart the walls or partitions 18. As the frame 28 is secured adjacent the bottom of the pan 10, the frame 28 will not interfere with the elongation or distortion of the pan 10 as substantially the major portion of the body of the pan 10 will be above the body of the frame 28. It will be noted that when the pan is so distorted the shoulders 32 separate from the side members of the frame 28, but that the projections 26 are secured in place by the end portions of the frame 28. It will be observed that when the pan has been distorted, such as illustrated in Fig. 4, the partitions 18 will tend to separate slightly so as to be free of the ice cubes which have been frozen therein.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

I claim:

1. An ice tray comprising a rectangularly shaped pan constructed of flexible material and integral external projections extending around each of the corners of said pan and disposed closer to the lower than to the upper edge thereof, each of said projections being provided with an opening therethrough, an integral shoulder extending along each of the longest sides of said pan externally thereof and between a pair of said projections, and a relatively rigid frame member extending through said opening and below said shoulders for supporting said pan intermediate the ends thereof, said frame member being separable from said shoulders so as to permit said pan to be flexed independently of flexure of said frame member.

2. An ice tray comprising a rectangularly shaped pan constructed of flexible material, an integral external projection along the end walls of said pan and disposed closer to the lower than to the upper edge thereof, said projections being provided with openings, a relatively rigid frame having end portions extending through said openings and portions extending along the sides of said pan and connecting said end portions, external projections along the sides of said pan separable from and adapted to rest on said frame for supporting said pan intermediate the ends thereof, said frame being adapted to permit the flexing of said pan between the ends thereof, a portion of said frame being formed to provide a handle at an elevation above that of the remainder of said frame.

3. An ice tray comprising a rectangularly shaped pan constructed of flexible material and provided with a plurality of pockets, an integral external projection along the end walls of said pan below the center line thereof, said projection being provided with openings, a relatively rigid frame having end portions extending through said openings and portions extending along the sides of said pan and connecting said end portions, external projections along the sides of said pan and adapted to rest on said frame for supporting said pan intermediate the ends thereof, the ends of said pan being adapted to pivot about the end portions of said frame to permit the flexing of said pan for enlarging the pockets therein.

4. In a device of the class described, a pan constructed of flexible material, a relatively rigid frame encircling said pan below the middle thereof and provided with a handle portion at one end thereof, means for pivotally securing the ends of said pan to the respective ends of said frame said frame being adapted normally to support portions of said pan intermediate the ends thereof and being disconnected from said portions so that said pan may be distorted independently of said frame.

5. In an ice tray, a pan constructed of flexible material, a single piece of wire of uniform gage formed to provide a frame for substantially entirely encircling said pan in a single plane and a loop for a handle, and means integral with said pan formed to provide a separable connection with said frame through which said frame projects, the portion of said wire lying intermediate said loop and said means being disposed adjacent the front of said pan for preventing distortion of said pan thereat.

6. An ice tray which comprises a pan of flexible material and a frame of rigid material, the frame being of one piece and substantially entirely encircling the side and end walls of the pan in a single plane, said pan being formed with integral projections contacting the frame whose contact with the frame is arranged to prevent substantial distortion of the pan downwardly but to permit its upward distortion to facilitate ice removal.

7. An ice tray which comprises a pan of flexible material and a supporting frame of rigid material, the frame being formed of a single piece of stock of uniform thickness which substantially entirely encircles the side and end walls of the pan in a single plane for contacting and supporting the tray, the contacting portions of the frame and pan including projections integral with the pan and through which the frame removably projects, and a handle projecting along the front surface of said pan above the plane of and formed integral with the frame.

JOHN C. BUCHANAN.